Jan. 4, 1944.  A. P. BALL  2,338,225
VEHICLE BODY
Filed July 17, 1939  3 Sheets-Sheet 1

INVENTOR
Albert P. Ball
BY Dike, Calvert & Gray
ATTORNEYS

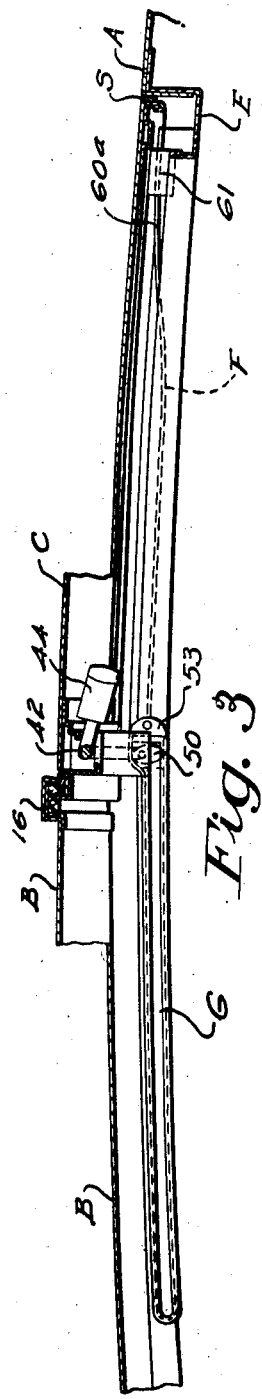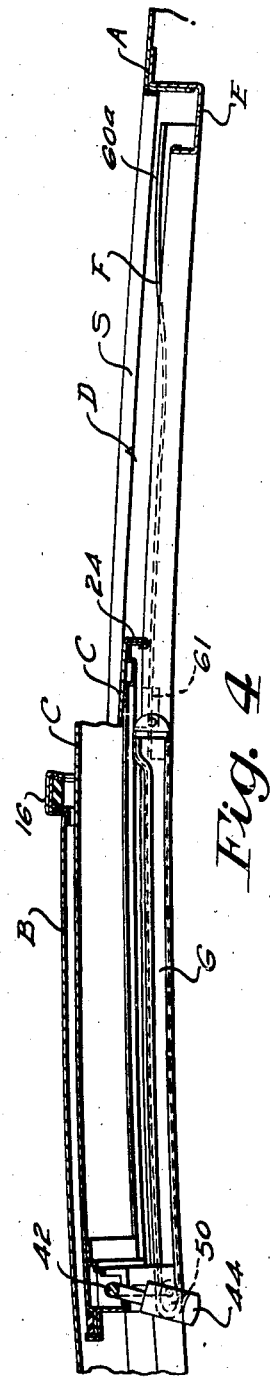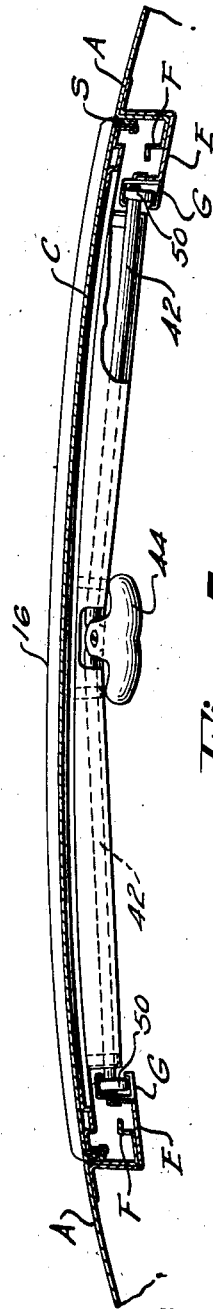

Jan. 4, 1944.  A. P. BALL  2,338,225
VEHICLE BODY
Filed July 17, 1939  3 Sheets-Sheet 3
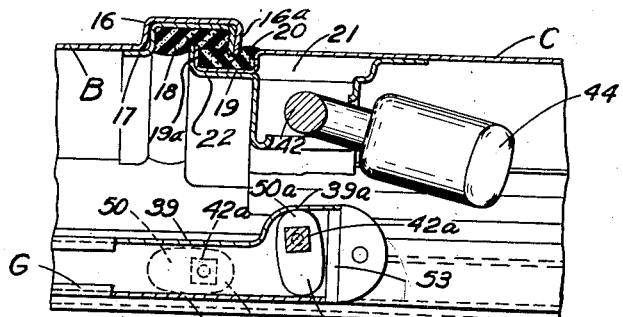
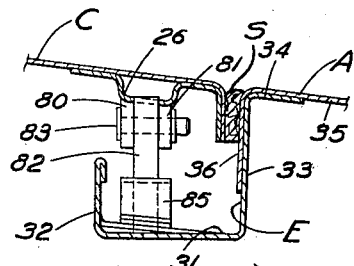
INVENTOR
Albert P. Ball
BY
Dike, Calvert & Gray
ATTORNEYS Patented Jan. 4, 1944

2,338,225

UNITED STATES PATENT OFFICE 2,338,225

VEHICLE BODY

Albert P. Ball, Detroit, Mich., assignor to Briggs Manufacturing Company, Detroit, Mich., a corporation of Michigan Application July 17, 1939, Serial No. 284,855

5 Claims. (Cl. 296—137)

This invention relates to vehicle bodies such, for example, as closed automobile bodies of the type having an opening formed in the roof thereof which is controlled by means of a movable or slidable roof panel.

An object of the present invention is to provide a closed vehicle body of the foregoing character with an adjustable roof panel which is supported, guided and controlled in an improved manner, whereby it is possible to attain in a closed vehicle body many of the advantages which were heretofore attainable only in bodies of the open type.

Another object of the invention is to provide an automobile body having a roof which is curved both longitudinally and transversely of the vehicle, and a movable or slidable panel for selectively closing an opening in the roof and for automatically sealing the opening when the slidable panel reaches the end of its closing movement.

Another object of the present invention is to provide an improved vehicle body having a slidable panel which is substantially straight and which is guided in a manner to effect the sealing of the panel at a plurality of its side edges by merely moving the panel into closed position and to automatically seal the trailing edge of the movable panel when the panel reaches the end of its closing movement.

A further object of the invention is to provide an improved vehicle body having a slidable panel, the trailing edge of which is raised or elevated into sealing engagement with a fixed portion of the roof structure at the end of the closing movement of the panel and in which the means for thus raising the panel also functions as a locking means.

A further object of the invention is to provide an improved body of the foregoing type in which a single handle for manually shifting the sliding panel is utilized for both locking the panel in sealed position and also elevating or lowering the trailing edge thereof.

Another object of the invention is to provide an improved vehicle body having a skylight opening in the roof thereof and a panel slidable beneath a closed portion of the roof to selectively close or open the skylight opening, the trailing edge of the panel and the adjacent edge of the roof being formed with opposed transverse channel-like ribs adapted to interfit or interlock when the panel is closed, sealing means being preferably anchored in the grooves or channels of the ribs and engageable by the edges of the panel and roof to effect a seal and also to assist in holding the panel firmly in closed position.

A further object of the invention is to provide an improved vehicle body having a skylight aperture formed in the roof thereof, a slidable panel for closing and sealing the aperture, an improved guide means for the panel constructed in such manner that the operation of sliding the panel into closed and open positions is relatively noiseless while at the same time, due to the resilience of the guide means, the panel may be shifted manually with a minimum of effort since variations due to inaccuracies in production or allowable tolerances will be accommodated.

A further object of the invention is to provide a vehicle body structure of the foregoing type in which the sliding panel when moved to closed position is raised at its trailing edge to effect a tight seal and is also raised at its opposite edge so that the panel will be positioned substantially flush with the main roof panel.

Another object of the invention is to provide an improved vehicle body having a roof structure provided with a skylight aperture and a slidable panel for closing and sealing the aperture, said panel having lever means or the like engageable with a fixed part of the roof structure for automatically raising or elevating the trailing edge of the panel into engagement with a closed portion of the roof structure at the end of the closing movement of the panel.

A further object of the invention is to provide a vehicle body of the foregoing type in which the movable panel is in part guided by cam or eccentric means slidable in guideways and adapted to contact abutments or stops at the end of the closing movement of the panel whereby the cam or eccentric means may be turned or partially rotated to elevate the trailing edge of the panel into sealing engagement with the roof structure adjacent the skylight opening and to lock the panel in closed position.

The above and other objects of this invention will appear in the following description and appended claims, reference being had to the accompanying drawings forming a part of this specification wherein like reference characters designate corresponding parts in the several views.

In said drawings:

Fig. 3 is an enlarged fragmentary longitudinal section taken substantially along the line 3—3 of Fig. 1 looking in the direction of the arrows.

Fig. 4 is a view similar to Fig. 3 showing the slidable panel in open position.

Fig. 5 is an enlarged transverse sectional view taken substantially along the line 5—5 of Fig. 1 looking in the direction of the arrows.

Fig. 8 is an enlarged fragmentary view taken in a plane longitudinally of the roof structure and showing one embodiment of the panel lifting or elevating means and the sealing means for the trailing edge thereof, the parts being in the positions in which they are shown in Fig. 3.

Fig. 9 is an enlarged detail transverse section, partly in elevation, showing the operating means or handle for moving the panel of Figs. 3 to 5, inclusive, and 8.

Fig. 10 is an enlarged fragmentary transverse section illustrating one of the cam or eccentric means for raising the panel.

Fig. 11 is an enlarged fragmentary longitudinal section, taken substantially along the line 11—11 of Fig. 1 looking in the direction of the arrows and illustrating modified locking means for the slidable panel.

Fig. 12 is a top plan view of the slidable panel locking means of Fig. 11.

Fig. 13 is an enlarged fragmentary transverse sectional view taken substantially along the line 13—13 of Fig. 1 looking in the direction of the arrows and showing modified means for lifting or elevating the slidable panel into sealing engagement with the roof structure.

Fig. 14 is a fragmentary side elevation, partly in section, of the panel lifting or elevating means of Fig. 13.

Fig. 15 is a view similar to Fig. 6 showing a modified form of guiding means for the panel.

Figure 1:
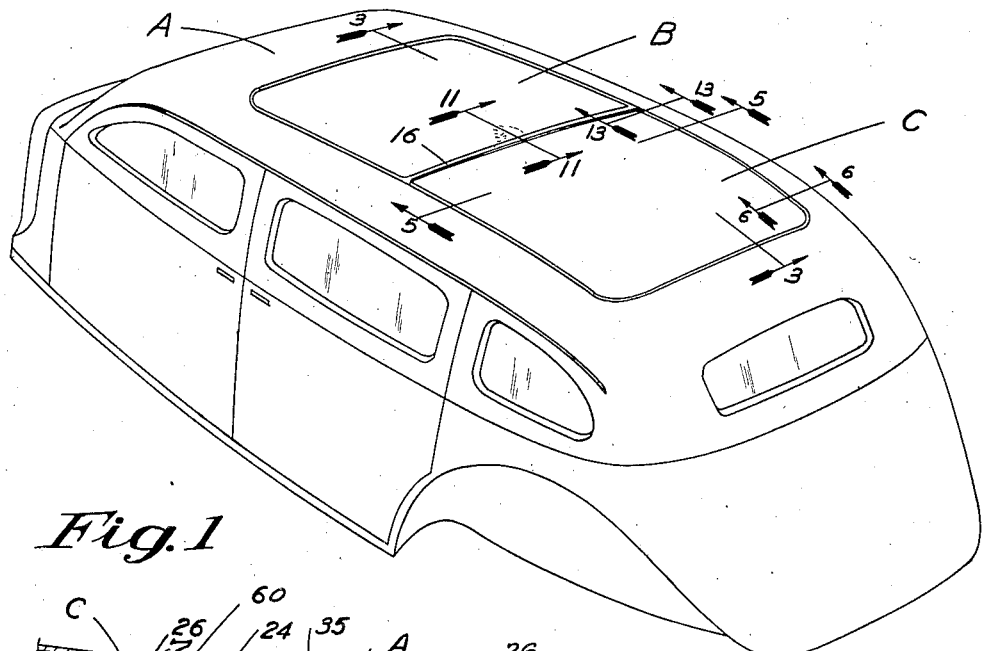
Fig. 1 is a perspective view of a vehicle body embodying the present invention, the slidable panel being shown in its closed position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain preferred embodiments of the present invention as applied to an automobile body having a pressed metal roof and a skylight opening or aperture formed therein which is controlled by a movable non-transparent panel, said panel being movable toward the front of the vehicle for uncovering the roof opening or aperture which is located at the rear of the vehicle body. If desired, however, the body may be constructed so that the movable panel will control an opening or skylight aperture which is located in the front portion of the roof structure.

Figures 6, 7:
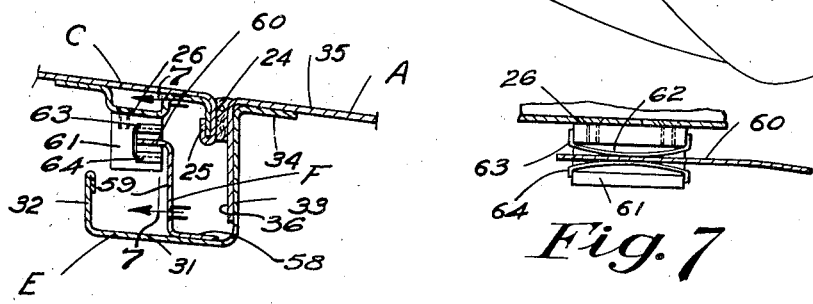
Fig. 6 is an enlarged fragmentary detail view taken substantially along the line 6—6 of Fig. 1 looking in the direction of the arrows.
Fig. 7 is a detail sectional view taken substantially through lines 7—7 of Fig. 6.

Referring now particularly to Figs. 1 to 10, inclusive, of the drawings, there is shown a vehicle body having a pressed metal roof structure A provided with a fixed or closed portion or panel B and a movable or slidable panel C which is adapted to close and/or open a skylight opening or aperture D, see Fig. 4. The panel B may comprise a separate metal sheet welded along its edges to the main roof panel A or may be formed as a seamless part thereof. A substantially U-shaped drain gutter or trough E (see Fig. 2) is attached to the roof structure and has two longitudinal portions which extend along opposite longitudinal sides or edges of the opening D and beneath the panel B and, as seen in Figs. 6 and 10, project laterally into the opening to underlie the side edges of the movable panel C. The legs or longitudinal portions of the gutter are interconnected by a transverse rear end portion which also extends into the skylight opening D, see particularly Figs. 3 and 4, to underlie the leading edge of the movable panel C when the panel is in the closed position as shown in Fig. 3.

The roof portion B is formed along its rear edge with an upwardly pressed rib 16 extending transversely in the form of an inverted channel and within this channel is secured, as by spot welding, a reinforcing channel strip 17 carrying a strip of compressible sealing material 18, such as sponge rubber, which is preferably cemented in place within the channel. The movable or sliding pressed metal panel C at its front edge, hereinafter referred to also as the trailing edge of the panel, is shaped or pressed to provide a transversely extending channel or groove 19. The channel 19 opens upwardly and carries a compressible sealing strip 20 similar to the strip 18, which is also cemented securely within the channel. Secured as by spot welding along the trailing edge of the sliding panel C and at the underside thereof is a casing member 21, this member being in the form of a channel and having flanging 22 fitting along the underside of the channel 19 and serving as a reinforcement therefor. The casing 21 provides an enclosure for the operating shafts, as hereinafter described, being provided with an opening or aperture 23 for the purpose of connecting a handle to these shafts. As seen in Fig. 10, the side edges of the top wall of the sliding panel C are flanged down at 24, these flanges being provided with return bent flanges 25 adapted to embrace the down bent flanges of a pair of longitudinally extending reinforcing strips 26 which are spot welded to the underface of the sliding panel C along the opposite side edges thereof. Each of the reinforcing strips 26 is formed intermediate its edges with a reinforcing rib.

Figure 2:
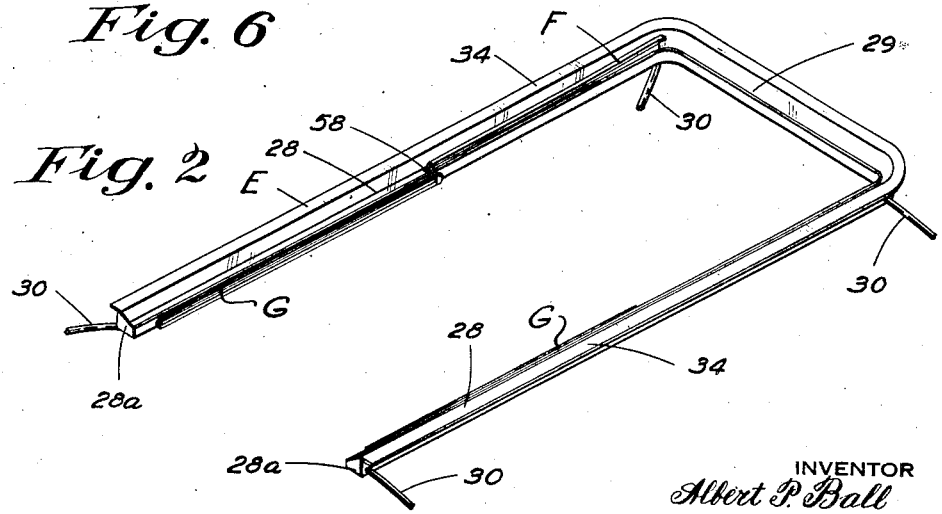
Fig. 2 is a perspective view of a drain gutter shown removed from the roof structure.

Referring to Fig. 2, it will be seen that the drain gutter E comprises longitudinally extending spaced channel members 28 and a transversely extending interconnecting channel 29 at the rear ends of the channels 28 and providing a continuation thereof. The forward ends of the channels 28 are closed by plates 28a, and at four points rubber hose sections 30 are attached to the channel members to carry off any water that may find its way into the drain gutter. The drain gutter has a base or bottom wall 31, see Fig. 6, an inner upstanding flange 32 and an outer upstanding flange 33, the latter having an out-turned flange 34. As seen in Figs. 6, 10 and 15, the portions 33 and 34 of the gutter are attached, as by spot welding, to the adjacent portions 35 and 36 of the fixed or closed portion of the roof structure A. Suitable sealing means S of any conventional type may be provided along the side and rear end edges of the sliding panel C above the drain gutter E, such as felt or resilient rubber sealing strips secured to the outer upright wall of the gutter adapted to be tightly engaged by the depending flanging 24 of the sliding panel when it reaches closed position.

Located beneath the closed or fixed portion of the roof structure at each longitudinal side thereof is a trackway or guideway G, each comprising an inwardly facing channel having its web 38 attached to the flange 32, as by spot welding. Each guide G has upper and lower substantially horizontal flanges 39 and 40, respectively, which extend inwardly from the web 38.

The sliding panel C carries at its trailing edge a rotatable rod or operating shaft which is housed within the casing or housing 21 and extends transversely therethrough. This shaft, as shown in Fig. 9, is formed in two sections 42, 42 having their inner meeting edges angularly bent to project through the opening 23 into the interior of the vehicle body. The ends 43 of the shaft are inserted in the socket portion 45 of a handle member 44 which is secured to the ends of the sections 43 by a set screw 46. The inner portions of the shaft sections 42 are held in position by bearing members 47 mounted within the housing 21. The outer ends of the shaft sections 42, as shown in Fig. 10, are similarly supported by bearing or strap members 48. As shown in Fig. 10, the outer end of each rod or shaft section 42 is reduced to provide flats 42a, to receive and support a generally oval shaped cam member 50 which is fixed onto the end of the shaft section by a set screw 51. It will be seen that each cam member 50 is eccentrically mounted upon one of the ends 42a of a shaft section, the outer end of the latter extending through an opening or hole formed in the upright end flange 22a of the housing 21. The end flanges 22a of the housing terminate in laterally extending flanges 23a which may be secured to the reinforcing members 26.

Referring particularly to Fig. 8, it will be seen that the guideway G at its rear end has an enlarged portion which is formed by upwardly offsetting the rear end of the top flange 39 of the guide. It will be seen that the height of the guideway at this point, beneath the offset 39a, is such as to accommodate the longer dimension of the cam 50 whereas the height of the guideway between the top and bottom flanges 39 and 40 substantially corresponds to the shorter dimension of the cam 50. A stop member or abutment 53 is provided at the end of each of the guides G, these abutments providing stops engageable by the cams 50 to limit the rearward movement of the sliding panel at its closed position. It will be seen that during the movement of the sliding panel between open and closed positions the cams 50 at opposite ends of the shaft 42 will travel within the guideways formed between the flanges 39 and 40, as shown in dotted lines in Fig. 8, each cam thus travelling in such position within the guideway that its longer dimension extends horizontally. Thus, the rear or trailing end of the sliding panel C is supported and guided in a longitudinal direction by the cams 50 travelling within the guideways G which are located beneath the fixed portion of the roof along the opposite longitudinal edges thereof. At the end of the closing movement of the panel C when the cams 50 reach the abutments 53 the trailing edge of the panel C may be raised by swinging the handle 44 upwardly, thus rocking the shaft sections 42 and turning the cams 50 to their upright positions as shown in full lines in Fig. 8. This movement of the cams will raise the trailing edge of the sliding panel to the position shown in Fig. 8 in which the down bent end flange 16a of the fixed roof section will be embedded in the rubber sealing strip 20 and the upwardly bent end flange 19a of the sliding panel will be embedded in the rubber sealing strip 18. Thus, it will be seen that the rib 16 on the fixed roof panel and the rib 19 on the sliding roof panel will interfit and become interlocked while effecting a water-tight seal at this juncture.

The sliding panel C may be operated to open the skylight aperture by first swinging the handle 44 downwardly to the position shown in Fig. 9, thereby shifting the trailing edge of the panel downwardly and somewhat forwardly through the action of the cams 50. By pushing forwardly on the handle 44 the panel C may be slid forwardly under the fixed roof section B as shown in Fig. 4. It will be understood that when the handle is swung down from the position of Fig. 8 to the position of Fig. 9 the cams 50 will be turned or partially rotated from the full line position of Fig. 8 to a horizontal position. During this motion of the cams 50 in a clockwise direction the end 50a of each cam will bear against the abutment 53 and force the opposite end of the cam into the narrow portion of the guideway G. During further opening movement of the sliding panel the cams will travel horizontally within the guideways, as shown in dotted lines in Fig. 8, thus supporting and guiding the trailing edge of the panel.

As illustrated particularly in Figs. 2 and 6, the rear or opening edge of the slidable panel C is supported and guided through the medium of track members F mounted within the longitudinal sides of the gutter E. Each track or guide member F may be in the form of an angle strip of Z-shape in cross-section comprising a bottom flange 58 spot welded to the base 31 of the gutter and an upstanding or substantially vertical flange 59 located between the side walls of the gutter. The flange 59 terminates at its upper edge in an inwardly extending guide flange 60. It will be understood that one such track or guide member F is mounted within each of the longitudinal portions 28 of the drain gutter. Secured to the underside of each of the ribbed reinforcing strips 26 at the rear end of the sliding panel C is a guide block or shoe 61. Each block 61 has at its outer face a longitudinal slot 62 which embraces the guide flange 60 of the guide F. A pair of leaf springs 63 and 64 are located within the guide slot 62. The ends of the springs are fixed to the end faces of the guide block, as shown in Fig. 7, and the springs are bowed inwardly within the slot so as to engage opposite faces of the guide flange 60. Since the springs are yieldable slightly in a vertical direction they will readily accommodate the contour of the guide flange 60 and provide sufficient yield or resiliency so that the panel will slide with a minimum of friction.

Referring particularly to Figs. 3 and 4, it will be seen that the roof panels A, B and C are crowned not only transversely but also in a longitudinal direction. When the skylight aperture is to be uncovered the trailing edge of the panel C is lowered and then slid beneath the fixed roof portion B. During this movement the opening edge of the sliding panel is also lowered, this being accomplished by forming the flange 59 of the guide F of increasing depth near the rear end of the roof opening thereby giving to the guide flange 60 a ramp effect as shown at 60a. Thus, the opening edge of the sliding panel moves upwardly into position at the closed position of the panel so as to position itself flush with the adjacent edge of the roof opening while at the same time the trailing edge is also elevated into sealing relation with the opposite edge of the opening. The longitudinal side edges of the roof opening may converge slightly from front to rear of the roof opening so as to obtain a wedging action between the panel side flanges 24 with its sealing strips S and the tapering or converging side flanges 36 of the fixed roof section.

In Fig. 15 there is illustrated a somewhat modified type of guide means mounted upon the bottom of the sliding panel C for cooperation with the guide tracks F. In this instance, in lieu of the guide shoe 61 and springs 63 and 64, there is provided a guide shoe 65 attached to the edge of the ribbed reinforcing strips 26 adjacent the rear edge of the panel C. Each shoe 65 has a laterally projecting guide portion 66 which underlies a strip 67 of felt or other suitable compressible material attached to the underside of the guide flange 60. After the panel C is slid into open and closed positions the underlying guide portions 66 of the guide shoes 65 will engage the guide strips 67 whereby the rear edge of the panel will be guided in proper manner and held against vertical displacement.

Referring now particularly to Figs. 11 and 12 of the drawings a somewhat modified form of locking device for maintaining the movable panel C in closed and sealed position is shown. This device comprises, as shown, preferably a knob or handle 70 secured to a transverse reinforcing plate 69 at the trailing edge of the panel C by means of spacer or washer members 71 and 72 and a shoulder bolt or screw device 73 so that the knob can be rotated or turned relative to the panel C. In this form of the invention the member 17 which forms a part of the cross rib 16 on the fixed panel B is extended forwardly of the roof structure at 17a and is bent back upon itself in spaced relation at 17b to provide a socket for receiving the dog end 75 of a lever 74 fixed to the top face of the knob 70 to rotate therewith. It will be understood that when the panel C is slid or moved into closed position with relation to the adjacent edge of the roof portion B by means of the knob 70 and the trailing edge of the panel C raised or elevated, as later described in connection with Figs. 13 and 14, the handle may be rotated to force the end 75 of the lever into the socket formed by the parts 17a and 17b. The lever end 75 and the socket provide, in effect, a camming action to hold the parts together and maintain the movable panel in closed, sealing and locked condition. As previously described, the upturned flanges of the members 19 and 69 of the movable panel embed themselves in the rubber strip 18 of the cross rib 16 whereas the downturned edges or flanges of the cross rib 16 likewise embed themselves in the rubber block or strip 20 to provide a tightly sealed joint.

Referring now particularly to Figs. 13 and 14 there is shown a device for automatically elevating the movable panel C at the end of its closing movement. In these figures a bracket comprising the spaced parts 80 and 81 is secured to the web portion of the member 26 carried by the movable panel C and supports a pivoted pawl or lever member 82, the upper rounded end of which projects through a slot in the member 26 as clearly seen in Fig. 13. The pawl or lever member 82 is journalled between the bracket parts 80 and 81 by a transverse pin or shaft 83 so that the member is permitted a limited oscillatory or rotative movement about the pin 81. In the present instance the web or base 31 of the drain gutter E is provided with a stop or abutment 85 which, as shown, is formed from a strip of metal bent upon itself to provide an upstanding loop portion 86 and end portions 87 which are preferably welded together and to the web 31 of the gutter. Immediately in advance of, or to the left in Fig. 14, of the stop or abutment 85, the web 31 is provided with a depressed portion or pocket 31a which is adapted to receive the nose or lead end 84 of the lifting lever 82. It will be understood that the stop 85 and the pocket or depression 31a are positioned substantially at a point corresponding to the end of travel or closing movement of the panel C. The normal position of the cam or pawl 83 is shown in broken lines in Fig. 14. When the lead end or nose 84 of the lever engages in the pocket 31a and contacts the lug or abutment 85, further movement of the panel C will effect a clockwise rotative movement of the pawl so that it will move from its broken line position to its full line or upright position shown in Fig. 14. This movement of the pawl will elevate the trailing edge of the movable panel C so that the sealing means carried thereby will be forced into intimate contact with the adjacent overhanging edge or cross rib 16 of the panel B. A counterclockwise or reverse movement of the pawl will occur when the panel is moved toward open position, with the nose of the cam or pawl riding along the surface of the web 31. It will be understood that a single lifting lever or pawl 82 is provided adjacent each longitudinal side of the movable panel C. These pawls ride along in the drain gutter until they come into contact with the stops 85 whereupon further movement toward closed position of the panel C effects the elevation of its trailing edge into sealing engagement with the fixed portion B of the roof structure, as explained above, whereupon the sliding panel may be locked by turning the knob 70.

Thus, considered from one of its broader aspects my invention contemplates providing a motor vehicle having a skylight roof with an aperture therein and a panel movable below the upper plane of said roof to open and to close said aperture selectively, said panel raisable at the end of its closing movement both at its leading and its trailing edges to come substantially into the plane of the upper surface of the roof structure, the rising of said panel at the leading edge being attained gradually and at its trailing edge relatively abruptly.

I claim:

1. In a vehicle body, a roof structure having a skylight opening formed therein, transversely spaced guideways carried by said roof structure beneath its upper surface and extending longitudinally thereof, a panel movable in said guideways to open and to close selectively said skylight opening, and locking means comprising a transverse rotatable shaft carried by said panel, a handle for operating said shaft and cams on the ends of said shaft engaging said guideways, said cams fitting into said guideways and slidable longitudinally therein while holding the panel against vertical displacement, said guideways terminating in offset portions permitting the cams to be rotated for raising and locking said panel at the end of the closing movement thereof.

2. In a vehicle body, a roof sheet having a skylight aperture, a sliding panel for closing said aperture and movable beneath the roof sheet to open the aperture, longitudinal guide channels at opposite sides beneath the roof sheet and each having vertically spaced inwardly extending horizontal flanges, elongated eccentric rotatable guide devices on the panel fitting into and adapted to slide in said channels between said flanges but held thereby against rotation when the longer axes of the devices are positioned substantially horizontally, the upper flanges of said channels being upwardly offset at their ends adjacent the skylight, and means for turning said devices at the locality of the offsets to position the devices with their longer axes extending vertically and thereby to raise the trailing edge of the panel.

3. In a vehicle body, a roof sheet having a skylight aperture, a sliding panel for closing said aperature and movable beneath the roof sheet to open the aperture, longitudinal guide channels beneath the roof sheet opening toward each other, rotatable eccentric guide devices slidable in said channels and each held therein against rotation and vertical displacement by the vertically spaced flanges of the channel, said channels having end portions of increased height adjacent the skylight permitting the guide devices upon entering said portions to be turned to raise the trailing edge of the panel.

4. In a vehicle body, a roof sheet having a skylight aperture, a sliding panel for closing said aperture and movable beneath the roof sheet to open the aperture, longitudinal guide channels beneath the roof sheet opening toward each other, rotatable eccentric guide devices slidable in said channels and each held therein against rotation and vertical displacement by the vertically spaced flanges of the channel, said channels having end portions adjacent the skylight of increased height permitting the guide devices upon entering said portions to be turned to raise the trailing edge of the panel, and means for turning said devices both to raise said trailing edge and also to lock the panel.

5. In a vehicle body, a roof sheet having a skylight aperture, a sliding panel for closing said aperture and movable beneath the roof sheet to open the aperture, longitudinal guide channels at opposite sides beneath the roof sheet and each having vertically spaced inwardly extending horizontal flanges, elongated curved rotatable guide devices adapted to slide in said channels between said flanges when the longer axes of said devices are positioned substantially horizontally, said flanges being positioned to hold said devices against turning, a cross shaft secured at opposite ends to said devices eccentrically thereof, the upper flanges of said channels being upwardly offset at their ends adjacent the skylight to provide vertically offset recesses, and means for turning said shaft to impart a turning movement to said devices at the locality of the offsets to position the devices within the recesses with their longer axes extending vertically and thereby to raise the trailing edge of the panel.

ALBERT P. BALL.